United States Patent [19]
Ejiri et al.

[11] Patent Number: 5,255,516
[45] Date of Patent: Oct. 26, 1993

[54] CORELESS TORQUE CONVERTER

[75] Inventors: Eiji Ejiri; Kazuhiro Takeda, both of Kanagawa, Japan

[73] Assignee: Nissan Motor Company, Ltd., Japan

[21] Appl. No.: 873,852

[22] Filed: Apr. 27, 1992

[30] Foreign Application Priority Data

May 10, 1991 [JP] Japan .................. 3-105862

[51] Int. Cl.$^5$ ............................ F16D 33/00
[52] U.S. Cl. ........................ 60/362; 60/365
[58] Field of Search ............ 60/341, 345, 361, 362, 60/364, 365

[56] References Cited
U.S. PATENT DOCUMENTS 3,287,908  11/1966  Mamo .................. 60/362

FOREIGN PATENT DOCUMENTS

52-147269  12/1977  Japan .
52-156269  12/1977  Japan .
 53-1757    1/1978  Japan .
 1-128055   8/1989  Japan .

*Primary Examiner*—Edward K. Look
*Assistant Examiner*—F. Daniel Lopez
*Attorney, Agent, or Firm*—Lowe, Price, LeBlanc & Becker

[57] ABSTRACT

In a torque converter of a coreless type allowing and utilizing a fluid flow in a central core region, the impeller blade exit angle is made smaller in the central core region than in an outer region surrounding the core region so as to increase the velocity and amount of the fluid flow circulating in the outer region and participating in torque multiplication, and decrease the velocity and amount of the fluid flow circulating in the core region like the fluid flow in a fluid coupling.

15 Claims, 6 Drawing Sheets

($\alpha 1 > \alpha 2 > \alpha 3$)

ROTATION

CORELESS TORQUE CONVERTER

BACKGROUND OF THE INVENTION

The present invention relates to torque converters, and specifically to coreless torque converters having no cores.

Japanese Utility Model Provisional Publication No. 1-128055 shows a conventional coreless torque converter of a three-element, single-stage, two-phase type. In the impeller member of an ordinary torque converter having cores, the fluid flow is confined between a shell (outside wall of the torus section) and a core (inside wall of the torus section). In the coreless torque converter, the fluid flows within a central core region, and participates in power transmission. Therefore, the amount of the circulating flow is greater, and the capacity is improved. In the conventional coreless torque converter, however, the impeller blades are shaped so that the exit angle is substantially constant from the outer end to the inner end of the exit. Similar coreless torque converters are shown in Japanese Patent Provisional Publications Nos. 52-156269, 53-1757, and 52-147269, and SAE paper 861213, page 6.

SUMMARY OF THE INVENTION

It is an object of the invention to provide a torque converter which is a type allowing a fluid flow in a central core region, and which has impeller blades designed to improve efficiency, torque ratio and other characteristics of the torque converter.

According to the present invention, a torque converter of a type allowing and utilizing a fluid flow in a central core region, comprises a turbine runner, a stator member, and a pump impeller comprising impeller shell and impeller blades. Each impeller blade comprises an entrance edge confronting the stator member, and an exit edge confronting the turbine runner. The exit edge of each impeller blade comprises an outer portion and an inner portion which is formed within a central core region and which is shaped so that an impeller blade exit angle is smaller than that in the outer portion. The outer portion having the larger exit angle increases the velocity and amount of the fluid flow which circulates through the stator member, the pump impeller and the turbine runner, while the inner portion having the smaller exit angle decreases the velocity and amount of the fluid flow which circulate in the central core region only between the pump impeller and the turbine runner without passing through the stator member like the fluid flow in a fluid coupling. As a result, the torque converter according to the present invention can improve the efficiency, the torque ratio and other characteristics of the hydrodynamic drive, while holding the capacity at a satisfactory level.

DETAILED DESCRIPTION OF THE INVENTION

Figure 1:
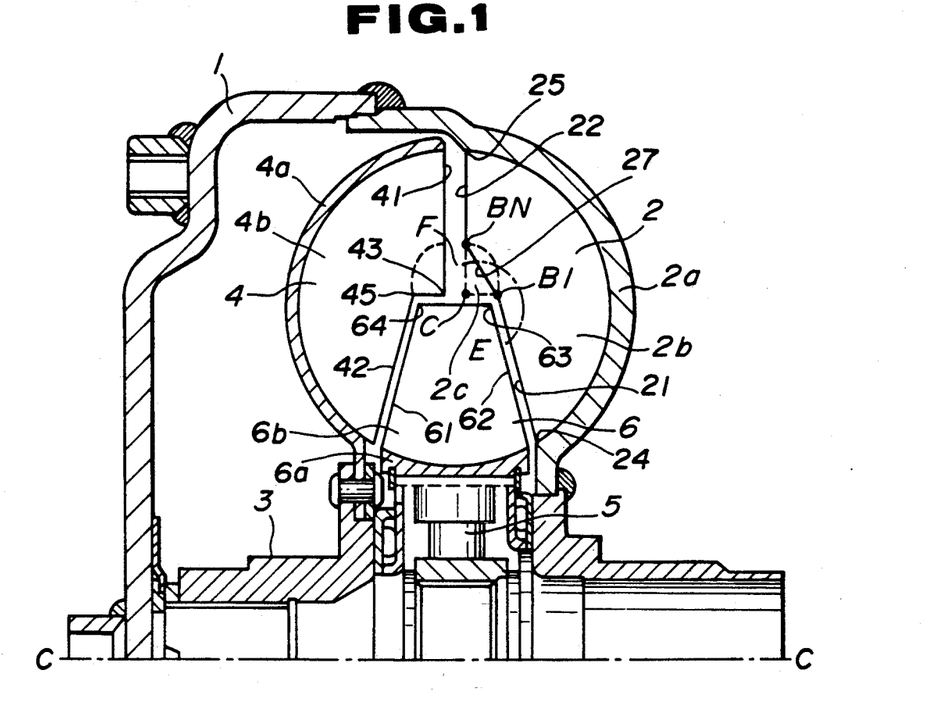
FIG. 1 is a sectional view showing a coreless torque converter according to a first embodiment of the present invention.

FIG. 1 shows a torque converter according to a first embodiment of the present invention.

This torque converter has a converter cover 1, a pump impeller 2, a turbine hub 3, a turbine runner 4, an one way clutch 5, and a stator 6. The converter cover 1 is connected with an engine such as an engine of a motor vehicle, and receives a driving torque from the engine. The pump impeller 2 is connected with the turbine cover 1, so that they rotate as a unit. The turbine runner 4 is connected through the turbine hub 3 with a transmission input shaft (not shown). The stator 6 is placed between the pump impeller 2 and the turbine runner 4, and connected through the one way clutch 5 to a case (not shown). Thus, the torque converter shown in FIG. 1 has three operating members; the pump impeller (power input member) 2, the turbine runner (power output member) 4, and the stator (reactor or reaction member) 6.

The torque converter of FIG. 1 is coreless. No core is formed in a central portion where blades of the impeller 2, the turbine runner 4 and the stator 6 converge.

The pump impeller 2 has an impeller shell 2a and impeller blades 2b. Each impeller blade 2b has an entrance edge 21 and an exit edge 22. The turbine runner 4 has a turbine shell 4a and turbine blades 4b. Each turbine blade 4b has an entrance edge 41 extending from the turbine shell 4a to a tip point 43, and an exit edge 42 extending from the turbine shell 4a to a corner point 45. The stator 6 has a stator shell 6a and stator blades 6b each of which has an entrance edge 61 and an exit edge 62. In each stator blade 6b, the exit edge 62 extends from the stator shell 6a to a first vertex point 63, and the entrance edge 63 extends from the stator shell 6a to a second vertex point 64.

In each impeller blade 2b, the entrance edge 21 extends from the impeller shell 2a to a corner point B1, and the exit edge extends from the impeller shell 2a to a predetermined intermediate point BN. Each impeller blade 2b further has a slant edge 27 extending from the intermediate point BN to the corner point B1 corresponding to the first vertex points 63 of the stator blades 6b. In this embodiment, the slant edge 27 is straight. Each impeller blade 2b has no triangular corner 2c bounded by the straight slant edge 27, an imaginary straight line segment extending from the intermediate point BN to a tip point C, an imaginary straight line segment extending from the tip point C to the corner point B1. Each impeller blade 2b has a shape obtained by cutting off the triangular corner 2c so as to form a chamfer or bevel. The tip points C of the impeller blades 2b correspond to the tip points 43 of the turbine blades 4b. Each turbine blade 4b shown in FIG. 1 is not bevelled, and has a triangular corner unlike the impeller blades 2b.

Figure 2:
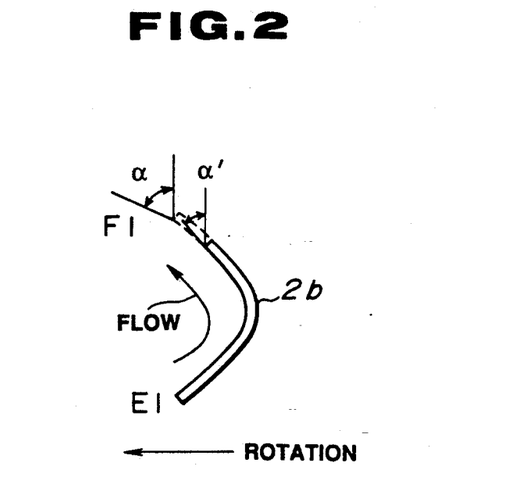
FIG. 2 is a sectional view of impeller blades, taken along a one dot chain line E-F shown in FIG. 1.

As shown in FIG. 2, the impeller blade exit angle $\alpha'$ ($<\alpha$) is made smaller by removing the angular portion 2c.

Figure 3:
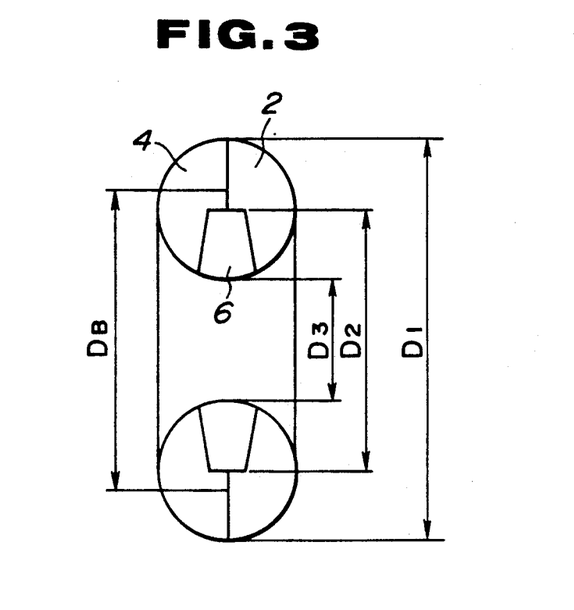
FIG. 3 is a schematic sectional view for showing a diameter $D_B$ used to determine the profile of the impeller blades of the torque converter of FIG. 1.

The intermediate point BN is the point of intersection between the exit of the pump impeller 2, and an imaginary core line which is so defined on the impeller 2 that there is formed, outside the imaginary core line, a fluid passage having a cross sectional area which is equal to the cross sectional area of the fluid passage of the stator 6. The imaginary core line bounds an impeller exit whose area is equal to the area of an annulus of the stator 6 formed in the section obtained if cut through an intersecting plane perpendicular to a center axis of the torque converter. The imaginary core line is determined as shown in FIG. 3. In FIG. 3, $D_1$ is an impeller outer diameter, $D_2$ is a stator outer diameter, $D_3$ is a stator inner diameter, and $D_B$ is an imaginary core diameter. The imaginary core diameter $D_B$ is given by the following equations.

$$D_2^2 - D_3^2 = D_1^2 - D_B^2$$

Therefore, $$D_B = \sqrt{D_1^2 - D_2^2 + D_3^2}$$

Figure 4:
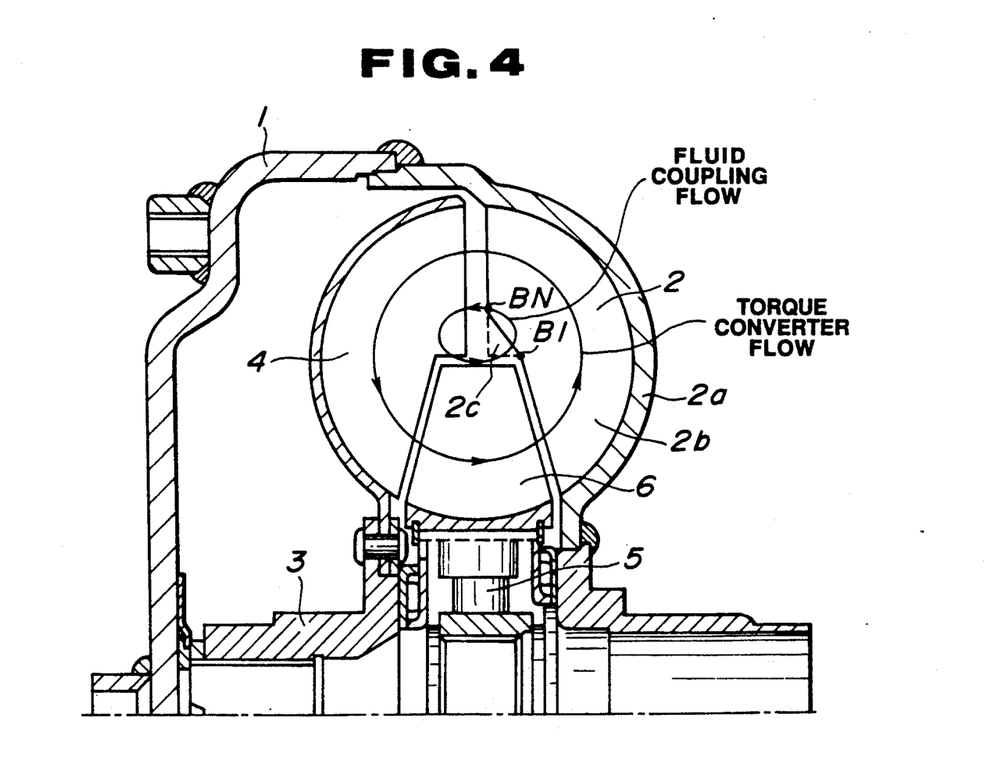
FIG. 4 is a sectional view for showing fluid flow patterns in the torque converter of the first embodiment.

FIG. 4 shows flow patterns in the torque converter of the first embodiment. In an outer region outside the imaginary core line, a fluid circulates through the stator 6, the impeller 2 and the turbine runner 4, and forms an outer flow acting as a torque converter flow with an ability of torque multiplication. In an inner region inside the imaginary core line, the fluid circulates between the impeller 2 and the turbine runner 4 without passing through the stator 6, and forms an inner flow acting as a fluid coupling flow having no or little ability to change torque.

The impeller exit angle have a great influence on the amount of a circulating flow. In this embodiment, the impeller exit angle in the inner region inside the imaginary core line is equal to the smaller angle $\alpha'$ while the impeller exit angle is equal to a larger angle $\alpha$ ($>\alpha'$) in the outer region outside the imaginary core line. In FIG. 2, the exit angle is positive in the direction of rotation of the pump impeller 2 shown by an arrow in FIG. 2. As the exit angle increases, the velocity of the fluid impelled toward the turbine runner 4 is increased, and the rate of the circulating flow is increased.

Therefore, the ratio of the rate of the fluid coupling flow circulating inside the imaginary core line and having a torque ratio equal to one, to the rate of the torque converter flow circulating outside the imaginary core line and having a torque ratio equal to or greater than one is reduced as compared with a conventional coreless torque converter. This ratio is influential in the performance of the hydrodynamic drive. Specifically, the impeller blade design of this embodiment can improve the efficiency, and the torque ratio.

The rate of the inner flow inside the imaginary core line is reduced. However, the flow velocity is low inside the imaginary core line. Therefore, small vortex flows formed in and around the imaginary core portion are repressed, and the loss due to collision between the small vortex flows and the outer circulating flow is reduced. In the torque converter of this embodiment, the rate of the outer flow is increased without decreasing the rate of the inner flow so much. The torque converter of this embodiment can minimize the flow rate decrease and capacity decrease.

Figure 5:
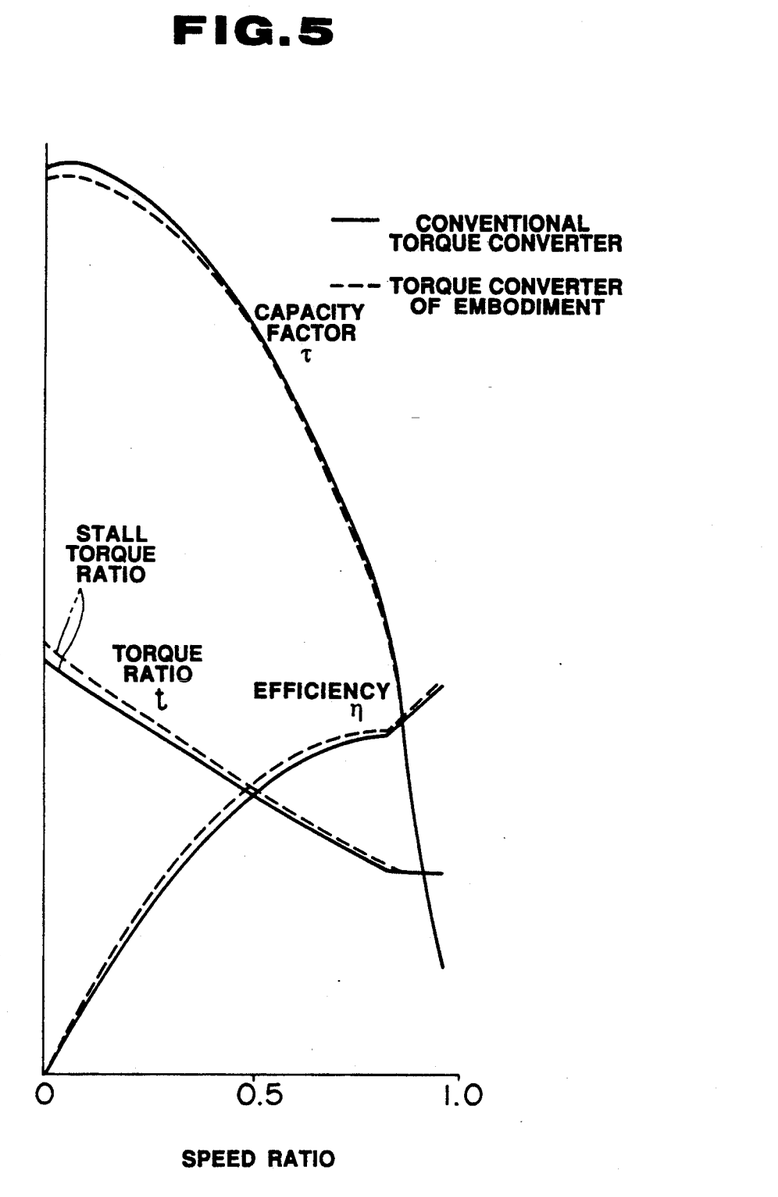
FIG. 5 is a graph showing characteristics of the torque converter of the first embodiment.

FIG. 5 shows characteristics of the torque converter of the first embodiment and the conventional coreless torque converter. The speed ratio is shown along a horizontal axis, and the capacity factor $\tau$, torque ratio t and efficiency $\eta$ are shown along a vertical line. Although the capacity is slightly reduced in a low speed ratio range, the torque converter of the first embodiment can improve the efficiency $\eta$ and the torque ratio t, as shown in FIG. 5. Especially, the efficiency $\eta$ is remarkably improved around a speed ratio of 0.5, and the stall torque ratio at a zero speed ratio is greatly improved.

The triangular portions 2c of the conventional impeller blades are weak in rigidity and susceptible to vibrations. In the impeller blades 2b of the first embodiment, the triangular portions 2c are eliminated. Therefore, this embodiment of the invention can increase the natural frequency of the impeller blades 2b, and offer advantages in vibrations and noises. Moreover, the durability of the impeller blades 2b is improved.

Figure 6:
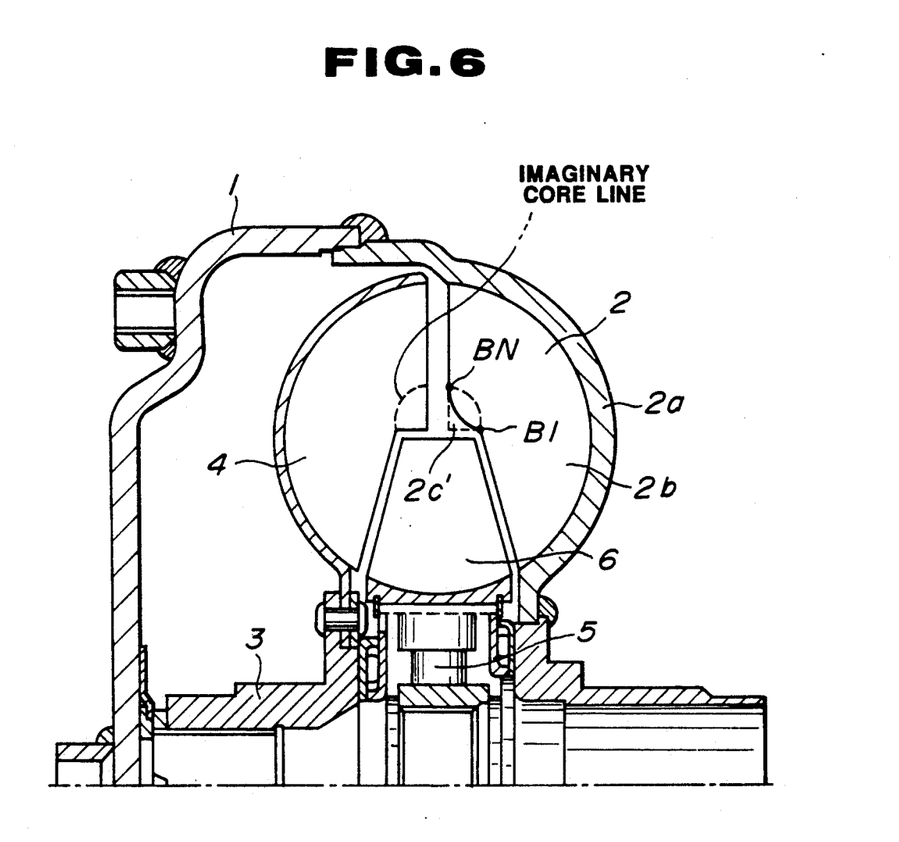
FIG. 6 is a sectional view showing a variation of the first embodiment.

FIG. 6 shows a variation of the first embodiment. Each impeller blade of this example has a curved slant edge 27' which is not straight but which is smoothly curved. The curved slant edge 27' extends along a smooth convex curved line segment extending from the intermediate point BN to the corner point B1. In this case, the triangular cut portion 2c' is bounded by the two straight sides and the smooth (concave) curve between BN and B1. In the example shown in FIG. 6, the smooth curved line of the slant edge 27' is a circular arc. However, it is possible to employ, as the curve of the slant edge 27', a parabolic curve, an elliptic curve or any other quadratic curve (curve of the second order).

The smooth curve edge 27' can mitigate stress concentration at the intermediate point BN and the corner point B1, and improve the rigidity of the impeller. In the case of press die forming, the productivity is improved.

When a quadratic curve such as a parabolic curve or an elliptic curve is employed, it is possible to employ a parameter design in which the quantity of the cut off portion can be easily controlled by using a parameter. Therefore, it is possible to adjust the capacity of the torque converter without changing the basic configuration so as to meet various demands such as starting performance, and fuel economy of the vehicle.

It is possible to employ a concave smooth curve instead of the convex curve, as the shape of the slant edge 27'.

Figure 7:
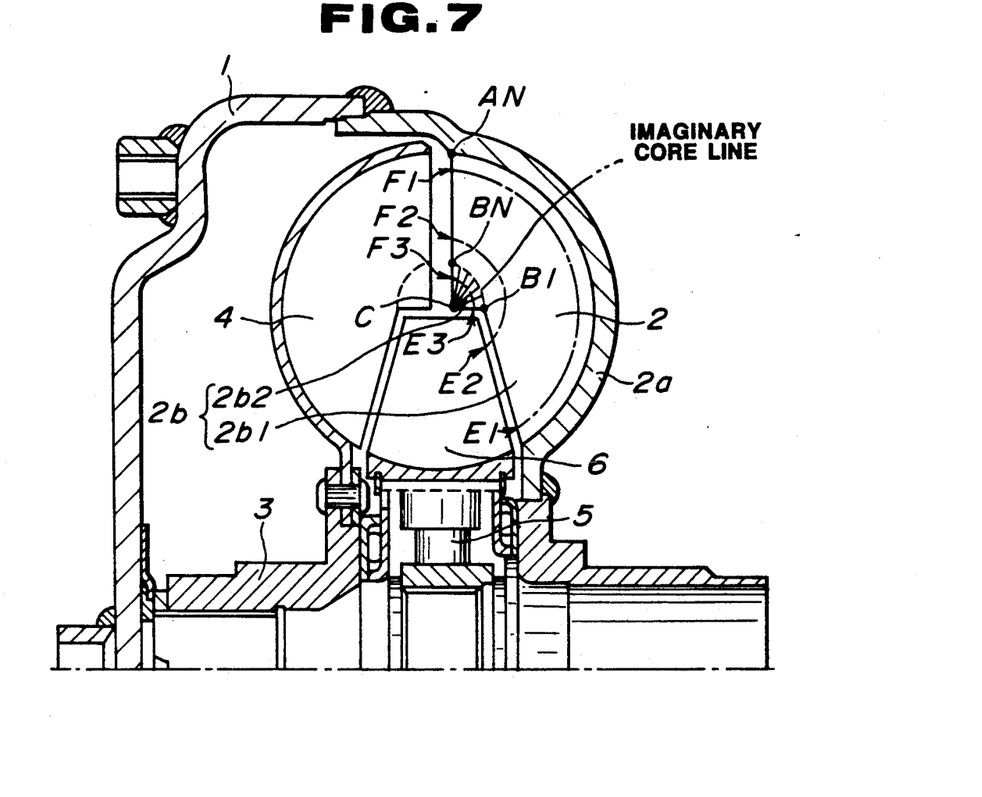
FIG. 7 is a sectional view of a torque converter according to a second embodiment of the present invention.
Figure 8:
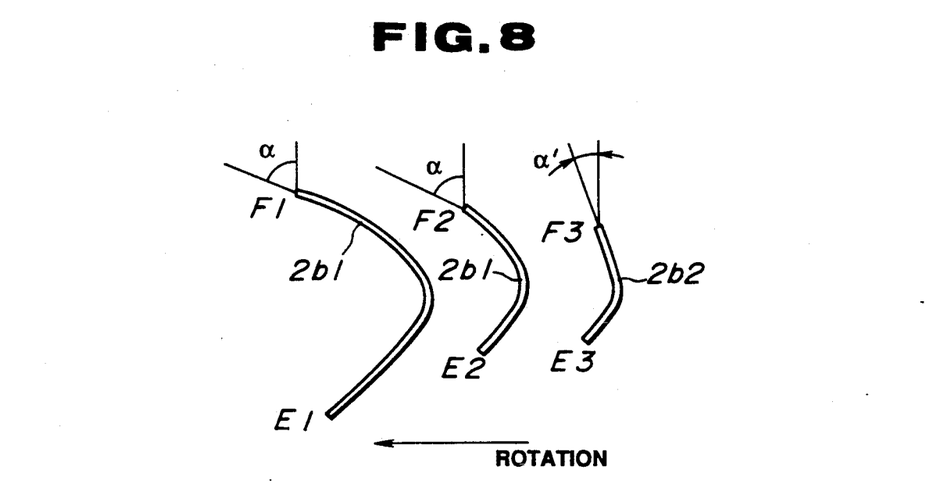
FIG. 8 shows sectional shapes of impeller blades of the torque converter of FIG. 7, taken along a line E1-F1, a line E2-F2 and a line E3-F3 shown in FIG. 7.

FIG. 7 shows a torque converter according to a second embodiment of the present invention. FIG. 8 shows sectional shapes of one impeller blade 2b along a line E1-F1, a line E2-F2 and a line E3-F3 shown in FIG. 7.

The torque converter shown in FIG. 7 has the three operating members 2, 4 and 6, and is coreless as in the first embodiment.

Unlike the impeller blades of the first embodiment, the impeller blades 2b of the pump impeller 2 of the second embodiment is not beveled but has an angled corner projecting up to a tip point C. The exit edge of each impeller blade 2b extends from an outer end AN located on the inside surface of the impeller shell 2a to the tip point C. The impeller blades 2b are so profiled that the exit angle is equal to a larger angle $\alpha$ between the outer end AN and the intermediate point BN defined in the same manner as in the first embodiment, and the exit angle is equal to a smaller angle $\alpha'$ ($>\alpha$) between the intermediate point BN and the tip point C. Each impeller blade 2b has an outer portion 2b1 whose surfaces are so curved as to form the lager exit angle $\alpha$, and an inner portion 2b2 whose surfaces are so curved as to form the smaller exit angle $\alpha'$. Therefore, the pump impeller 2 of the second embodiment can increase the amount of the torque converter flow and decrease the amount of the fluid coupling flow inside the imaginary core line in the same manner as in the first embodiment. The torque converter of the second embodiment can improve the efficiency and torque ratio while minimizing the decrease of the capacity. The pump impeller 2 of the second embodiment does not require a marked change in blade design. Therefore, the second embodiment is advantageous in manufacturing cost.

Figure 9:
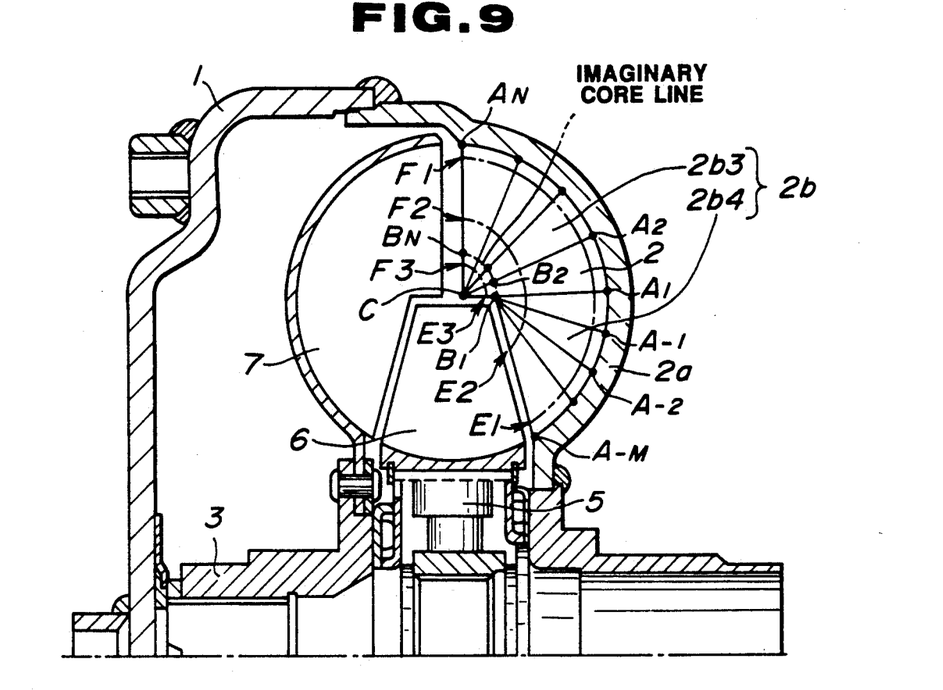
FIG. 9 is a sectional view showing a torque converter according to a third embodiment of the present invention.
Figure 10:
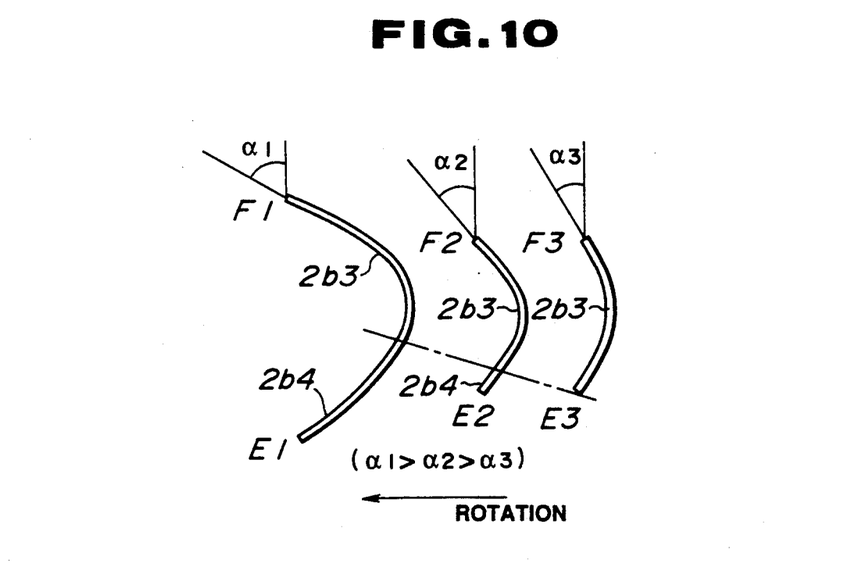
FIG. 10 shows sectional shapes of impeller blades of the torque converter of FIG. 9, taken along a line E1-F1, a line E2-F2 and a line E3-F3 of FIG. 9.

FIG. 9 shows a torque converter according to a third embodiment of the present invention. FIG. 10 shows sections of one impeller blade 2b taken along a line E1-F1, a line E2-F2 and a line E3-F3 shown in FIG. 9.

The torque converter of FIG. 9 has the pump impeller 2, the turbine runner 4 and the stator 6 but has no cores, as in the preceding embodiments.

The impeller blades 2b of the third embodiment are shaped in the following manner. Each impeller blades has an first portion 2b3 and a second portion 2b4. In the section of FIG. 9, definition points A1, A2 ... AN are distributed on the inside surface of the impeller shell 2a, and definition points B1, B2 ... BN are distributed on an imaginary core surface. A fluid passage bounded between the imaginary core surface and the inside shell surface of the impeller shell 2a in the pump impeller has a cross sectional area which is equal to the cross sectional area of the fluid passage of the stator 6. The points A1, B1 and C lie on the same straight line as shown in FIG. 9. The points A2, B2 and C are also collinear. These points are grouped so that the three points A1, B1 and C constitute a first set, the three points A2, B2 and C constitute a second set, ..., and the three points AN, BN and C constitute an N-th set. A first smooth curved line (such as a parabola or a spline curve) is defined so as to connect the points A1, B1 and C of the first set. Similarly, the points A2, B2 and C of the second set are connected by a second smooth curved line. In this way, many smooth curved lines are formed so that each line passes through the three points of a unique one of the sets. A smooth curved surface A1ANC is defined by a collection of these smooth curved lines of the sets so that the impeller blade exit angle is made smaller toward the tip point C. The surfaces of the first portions 2b3 of the impeller blades 2b have the form of this smooth curved surface. As shown in FIG. 10, the exit angle $\alpha 2$ at the middle exit point F2 is made smaller than the exit angle $\alpha 1$ at the outer exit point F1, and the exit angle $\alpha 3$ at the inner exit point F3 is smaller than the middle exit angle $\alpha 2$.

The blade shape of the second portions 1b4 of the impeller blades 2b is determined by a smooth curved surface determined by a collection of smooth curved lines radiating from the point B1 to definition points A-1, A-2, ... and A-M distributed on the inside shell surface. These lines are curved so as to form an appropriate impeller entrance angle.

A technique for forming curved impeller surfaces by a set of curved lines is disclosed in "Ryutai Dendo Souchi No Sekkei (Design of Hydrodynamic Drive)" (written by Ishihara Tomoo, published by Ohmu Sha), pages 37–40.

In the third embodiment, the impeller exit angle is decreased gradually from the outer point AN toward the tip point C so as to increase the rate of the outer torque converter flow and decrease the rate of the inner fluid coupling flow. The torque converter of the third embodiment can improve the efficiency and torque ratio and minimize the decrease of the capacity as in the preceding embodiments. The curved surfaces of the third embodiment is advantageous in rigidity of the impeller blades and in manufacturing process. The design of the third embodiment helps prevent buckling in the case of sheet metal press forming, and facilitates the flow of molten metal in the case of casting.

As explained above, the impeller exit angle is made smaller in an imaginary core region inside an imaginary intermediate right circular cylinder having a diameter DB as shown in FIG. 3. In a predetermined section perpendicular to the center axis C—C of the torque converter, the fluid passage in the stator is in the form of an annulus bounded between an imaginary right circular cylinder having a diameter D2, and an imaginary right circular cylinder having a diameter D3 as shown in FIG. 3. The area of the annular outer exit of the impeller is substantially equal to the area of this annulus of the stator. The fluid coming from the stator 2 goes out through the annular outer exit of the impeller bounded between a first imaginary right circular cylinder having a diameter D1 which is equal to a torque converter size, and the intermediate cylinder. The entrance edges of the impeller blades are regularly and radially arranged in an annular entrance surface which may be a conical surface, and the outer exit portions of the exit edges of the impeller blades of a larger exit angle are regularly and radially arranged in an annular outer exit surface which has an area substantially equal to the area of the entrance surface for receiving the fluid from the stator. In the illustrated examples, the outer exit surface is flat and perpendicular to the center axis of the torque converter. The slant edges 27 of FIG. 1 are regularly and radially arranged in an annular oblique surface which is a conical surface.

In the embodiment illustrated in FIG. 1, this conical surface is a ruled surface obtained by rotating a straight line (generatrix) intersecting the center axis C—C at an intersection point (the vertex of a cone) around the center axis C—C. Similarly, each curved slant edge of the example shown in FIG. 6 lies on a curved surfaced obtained by rotating a smooth curved line around the center axis C—C.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:
1. A coreless torque converter, comprising:
   a turbine runner comprising turbine blades; and a stator member comprising a stator shell and stator blades each comprising an exit edge extending from said stator shell to a first vertex point, and an entrance edge extending from said stator shell to a second vertex point; and a pump impeller comprises an impeller shell, and impeller blades projecting from said impeller shell into a central space in which said turbine blades, wherein said stator blades and said impeller blades converge so that no core is formed in said central space, each of said impeller blades comprising an outer exit edge extending from said impeller shell to an intermediate point, and a slant edge extending from said intermediate point to a corner point corresponding to said first vertex point of said stator member, said intermediate point being approximately located on an imaginary core line which is so defined in said pump impeller that there is formed, outside said imaginary core line, a fluid passage having a cross-sectional area equal to a cross-sectional area of a fluid passage of said stator member, said slant edge extending along one of a straight line and a curved line;

wherein said slant edge of each of said impeller blades is so inclined that said slant edge deviates in direction from an axial direction parallel to a center axis of said torque converter and from a radial direction perpendicular to said center axis.

2. A torque converter according to claim 1, wherein: said intermediate point and said corner point of each impeller blade are spaced apart from each other along the axial direction, and a radial distance of said intermediate point from said center axis is greater than a radial distance of said corner point from said center axis.

3. A torque converter according to claim 2, wherein: said intermediate point is located axially between said corner point and said turbine runner along said axial direction, and said slant edge of each impeller blade lies in an imaginary conical surface obtained by rotating, around said center axis, a generating line intersecting said center axis at a fixed point, said generating line being one of a straight line and a smooth curved line.

4. A torque converter according to claim 2, wherein: each of said impeller blades is profiled so that an impeller blade exit angle is smaller in said slant edge than in said outer exit edge.

5. A torque converter according to claim 2, wherein: said turbine runner further comprises a turbine shell, and each of said turbine blades projects from said turbine shell and comprises a turbine entrance edge and a turbine exit edge, and wherein said turbine entrance edges of said turbine blades are radially arranged in an annular turbine entrance surface and said outer exit edges of said impeller blades are radially arranged in an annular outer exit surface which confronts said turbine entrance surface.

6. A torque converter according to claim 5, wherein: said turbine entrance surface and said outer exit surface of said impeller are both flat and perpendicular to said center axis.

7. A coreless torque converter comprising:
a turbine runner comprising turbine blades; and
a stator member comprising a stator shell and stator blades each comprising an exit edge extending from said stator shell to a first vertex point, and an entrance edge extending from said stator shell to a second vertex point; and a pump impeller comprises an impeller shell, and impeller blades projecting from said impeller shell into a central space in which said turbine blades, said stator blades and said impeller blades converge so that no core is formed in said central space and said torque converter is coreless, each of said impeller blades comprises an exit edge extending from said impeller shell through an intermediate point to an inner exit end, said intermediate point being located on an imaginary core line which is so defined in said pump impeller that there is formed, outside said imaginary core line, a fluid passage having a cross sectional area equal to a cross sectional area of a fluid passage of said stator member, each of said impeller blades being profiled so that an impeller exit angle is smaller in an inner range between said intermediate point and said inner end of said exit edge than in an outer range outside said intermediate point.

8. A coreless torque converter according to claim 7 wherein each of said impeller blades has a blade shape which is determined by a collection of smooth curved lines which make said impeller exit angle smaller toward said inner exit end, and each of which smoothly connects said inner exit end, one of points distributed on said imaginary core line, and one of points distributed on an inside surface of said impeller shell.

9. A torque converter comprising:
a stator member comprising a stator shell and stator blades each of which projects from said stator shell and each of which comprises an entrance edge and an exit edge;
a turbine runner comprising a turbine shell and turbine blades each of which projects from said turbine shell and each of which comprises an entrance edge and an exit edge;
a pump impeller comprising an impeller shell and impeller blades each of which projects from said impeller shell, and each of which comprises an entrance edge, and an exit edge comprising an outer exit portion for directing a fluid flow entering said turbine runner from said stator element, and an inner exit portion for directing a fluid flow circulating between said turbine runner and said pump impeller without passing through said stator element, said outer exit portion extending radially inwardly from said impeller shell to an intermediate point, and said inner exit portion extending from said intermediate point toward said stator member, each of said impeller blades being profiled so that an impeller blade exit angle is smaller in said inner exit portion than in said outer exit portion.

10. A torque converter according to claim 9 wherein said pump impeller is coreless so that a flow circuit in said pump impeller is closed only by said impeller shell.

11. A torque converter according to claim 9 wherein said outer exit portions of said exit edges of said impeller blades are radially arranged between a first imaginary right circular cylinder having an axis coincident with a center axis of said torque converter, and an intermediate imaginary right circular cylinder which is coaxial with said first cylinder and which is smaller in diameter than said first cylinder, and said inner exit portions of said exit edges of said impeller blades are radially arranged within said intermediate cylinder, said first imaginary cylinder having a diameter which is equal to a torque converter size of said torque converter, and said intermediate imaginary cylinder having such a size that an area of an annulus formed by said first and intermediate cylinders in a cross section is equal to a cross sectional area of an annular fluid passage in said stator member.

12. A torque converter according to claim 11 wherein said stator blades are bounded between a second imaginary right circular cylinder which is coaxial with said first imaginary cylinder, and a third imaginary right circular cylinder which is coaxial with said second cylinder and smaller in diameter than said second cylinder, and said area of said annulus formed by said first and intermediate cylinders is equal to an area of an annulus formed by said second and third imaginary cylinders in a cross section.

13. A torque converter according to claim 12 wherein said outer exit portion of said exit edge of each of said impeller blades extends along a first smooth line segment from said impeller shell to said intermediate point lying on said intermediate imaginary cylinder, said entrance edge of each of said impeller blades extend along a second smooth line segment from said impeller shell to a corner point, and said inner exit portion of said exit edge of each of said impeller blades smoothly extends along a third smooth line segment from said intermediate point to said corner point.

14. A torque converter according to claim 9 wherein said entrance edges of said impeller blades are radially arranged in an annular entrance surface, said outer exit portions of said impeller blades are radially arranged in an annular outer exit surface which extends radially inwardly from an inside surface of said impeller shell and which has an area substantially equal to an area of said annular entrance surface, and said inner exit portions of said impeller blades are radially arranged in an annular inner exit surface which extends radially inwardly from an inner boundary of said outer exit surface.

15. A torque converter according to claim 14 wherein said outer exit surface is flat and perpendicular to a center axis of said torque converter, and said annular inner exit surface is bounded between an outer circular boundary and an inner circular boundary which is spaced from said outer boundary along said center axis.

* * * * *